(12) United States Patent
Yang et al.

(10) Patent No.: US 8,750,199 B2
(45) Date of Patent: Jun. 10, 2014

(54) CELL SELECTION HANDOFF FOR CDMA2000 1X ADVANCE

(75) Inventors: Hong-Kui Yang, San Diego, CA (US); Jian Gu, Beijing (CN); Tingting Miao, Beijing (CN); Shu Wang, San Diego, CA (US); Zhigang Tian, Beijing (CN)

(73) Assignee: VIA Telecom Co., Ltd., George Town (KY)

( * ) Notice: Subject to any disclaimer, the term of this patent is extended or adjusted under 35 U.S.C. 154(b) by 470 days.

(21) Appl. No.: 12/624,027

(22) Filed: Nov. 23, 2009

(65) Prior Publication Data

US 2010/0136979 A1 Jun. 3, 2010

Related U.S. Application Data

(60) Provisional application No. 61/118,487, filed on Nov. 28, 2008, provisional application No. 61/149,029, filed on Feb. 2, 2009.

(51) Int. Cl.
*H04W 36/18* (2009.01)

(52) U.S. Cl.
USPC .......................................................... 370/318

(58) Field of Classification Search
None
See application file for complete search history.

(56) References Cited

U.S. PATENT DOCUMENTS

| | | | |
|---|---|---|---|
| 5,982,758 A | 11/1999 | Hamdy | |
| 6,366,777 B1 | 4/2002 | Uusitalo | |
| 6,888,805 B2 * | 5/2005 | Bender et al. | 370/314 |
| 7,369,549 B2 * | 5/2008 | Wu et al. | 370/389 |
| 2002/0111158 A1 * | 8/2002 | Tee | 455/421 |
| 2003/0012174 A1 | 1/2003 | Bender et al. | |
| 2004/0190507 A1 | 9/2004 | Wu et al. | |
| 2009/0232052 A1 * | 9/2009 | Black et al. | 370/328 |
| 2010/0151873 A1 * | 6/2010 | Gorokhov et al. | 455/452.1 |

FOREIGN PATENT DOCUMENTS

| CN | 1264530 A | 8/2000 |
|---|---|---|
| CN | 101184292 | 5/2008 |

* cited by examiner

*Primary Examiner* — John Blanton
*Assistant Examiner* — Alan Lindenbaum
(74) *Attorney, Agent, or Firm* — Richard K. Huffman; James W. Huffman (57) ABSTRACT

An apparatus for performing a soft handoff including a power estimator, cell selector, and feedback channel generator. The power estimator receives a plurality of pilot signals that each correspond to an associated base station within an active set registry, and estimates a power level for each of the plurality of pilot signals. The cell selector is coupled to the power estimator, and is configured to select one or more base stations within the active set registry for selective blanking of a corresponding one or more of the plurality of pilot signals during a soft handoff operation. The feedback channel generator is coupled to the cell selector, and is configured to generate a cell selection feedback signal indicating the one or more base stations, where the cell selection feedback signal is subsequently transmitted to the one or more base stations, and where the cell selection feedback signal directs the one or more base stations to perform the selective blanking.

22 Claims, 5 Drawing Sheets

FIG. 1

MOBILE STATION TRAVERSING THREE ADJACENT CELLS

FIG. 2

SIGNAL STRENGTH SEEN BY MOBILE STATION DURING TRAVERSE

*DIRECT GENERATION OF R-CSFCH CHANNEL*

FIG. 7

*TIME MULTIPLEXED EMBODIMENT*

FIG. 8

CELL SELECTION HANDOFF FOR CDMA2000 1X ADVANCE

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
|---|---|---|
| 61118487 (VTU.09-0003-US) | Nov. 28, 2008 | CELL SELECTION HANDOFF FOR CDMA2000 1X ADVANCE |
| 61149029 (VTU.09-0022-US) | Feb. 02, 2009 | CELL SELECTION HANDOFF FOR CDMA2000 1X ADVANCE |

BACKGROUND OF THE INVENTION

1. Field of the Invention

This invention relates in general to the field of microelectronics, and more particularly to an apparatus and method for performing a cell selective soft handoff in a mobile telecommunications system that utilizes code division multiple access as the underlying communications method.

2. Description of the Related Art

The cell phone industry is undergoing exponential growth, not only in the this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems prevalently employed frequency division multiple access (FDMA) as the modulation strategy. One well known example of this technology is Global System for Mobile Communications (GSM), in which a particular cell phone communicates with its base station within a given cell over a specific frequency channel. In order for that cell phone to communicate with a base station in an adjacent cell, it must be assigned a new frequency channel and the switch coordinated in time with the old base station, the new base station, and the cell phone itself. This type of handoff from one cell to the next is known as a hard handoff.

Currently, so-called "3G" or third generation cellular communications technologies are being developed. These technologies are not characterized so much by modulation techniques, but more so by performance metrics (e.g., 2 Megabits per second indoor data rates, 384 Kilobits per second outdoor data rates). As such, there are presently a number of diverse approaches being proposed for 3G.

In the interim, a number of hybrid technologies are being provided, known as "2.5G" techniques and protocols, one of which is CDMA2000 1x. This system utilizes spread spectrum code division multiple access (CDMA) techniques to multiplex many move users over a single frequency channel that can be attained through the use of current FDMA systems. Under CDMA, the same frequency channel is used to communicate with all of the mobile stations within a group of adjacent cells and signals to and from the mobile stations are uniquely encoded using orthogonal codes.

Since the same frequency channel is used by adjacent base stations, this allows multiple base stations to provide for communications with a single cell phone, and as such, the phone is able to gracefully transition from one cell to the next. That is, two or more base stations in adjacent cells may be communicating with a single cell phone where their coverage areas overlap, but only one base station is designated as primary controller for the mobile station. As handoff to the next cell is coordinated between the base stations and the mobile station, it is realized often times in a coordinated change of designation within the cell phone itself. That is, rather than a "hard" switch from one frequency channel to the next, a "soft" switch is affected when the cell phone designates a base station with which it is currently communicating as its new primary base station.

The above advantages to the use of CDMA for cell handoff notwithstanding, the present inventors have observed that there are several problems and limitations to current approaches to cell handoff. One problem results from the fact that all base stations within a given area utilize the same frequencies to communicate. While one skilled in the art will appreciate that in the ideal a better estimation of signal content can be made when there are more signals received that carry the same information, a practical cell phone does not provide the capacity to process more than a fixed number of signals and thus, any signals that are weak (due to distance between a far base station and a given mobile) become difficult to process. Another problem is due to multipath effects. That is, reflected (i.e., delayed) copies of the same signal tend to add processing load on a mobile station, particularly when it is at the edges of adjacent cells. As has been observed, these delayed copies and weak transmissions from far base stations, rather than contributing to the overall reception quality of a mobile station within the network, have become problematic sources of interference, particularly when the mobile station transitions from one cell to the next.

Therefore, what is needed is an apparatus and method whereby weak signals from either far base stations or multipath sources can be identified and precluded in a CDMA handoff scenario.

In addition, what is needed is a mechanism in both mobile stations and base stations that allows for more efficient utilization of resources during a soft handoff.

SUMMARY OF THE INVENTION

The present invention, among other applications, is directed to solving the above-noted problems and addresses other problems, disadvantages, and limitations of the prior art. The present invention provides a superior technique for performing soft handoff in a CDMA-based telecommunications system. In one embodiment, an apparatus is provided for performing a soft handoff. The apparatus includes a power estimator, configured to estimate a power level for a plurality of pilot signals that each correspond to one of the plurality of base stations; a cell selector, coupled to said power estimator, configured to select at least one base stations for blanking in response to said power levels of pilot signals of corresponding base stations, the selected base stations are indicated in a plurality of bits; and a feedback channel generator, coupled to said cell selector, configured to generate a plurality of cell selection feedback signals indicating said plurality of corresponding base stations, wherein each of the cell selection feedback signal is transmitted to said plurality of corresponding base stations, and said cell selection feedback signal directs said corresponding base stations to perform said blanking.

One aspect of the present invention contemplates a method for a mobile apparatus which is wirelessly coupled to a plurality of base station, comprising estimating a power level for a plurality of pilot signals that each correspond to one of the plurality of base stations; selecting at least one base stations for blanking in response to said power levels of pilot signals of corresponding base stations, the selected base stations are indicated in a plurality of bits; and generating a plurality of cell selection feedback signals indicating said plurality of corresponding base stations, wherein each of the cell selection feedback signal is transmitted to said plurality of corresponding base stations, and said cell selection feedback signal directs said one or more corresponding base stations to perform said blanking.

Another aspect of the present invention comprehends a base station wirelessly coupled to a mobile apparatus, comprising: a pilot signal generator, configured to generate a pilot signal corresponding to the base station, wherein the pilot signal comprising a plurality of sub-frame units; a receiver, configured to received a cell selection feedback signal which indicates whether the base station is selected by the mobile apparatus, the cell selection feedback signal is calculated by the mobile apparatus according to the pilot signal; and a processor, coupled to the pilot generator and the receiver, if the base station is selected, the processor is configured to perform hand off and communicate with the mobile apparatus.

The present invention also includes a method for a base station coupled to a mobile apparatus, comprising: generating a pilot signal corresponding to the base station, wherein the pilot signal comprising a plurality of sub-frame units; receiving a cell selection feedback signal which indicates whether the base station is selected by the mobile apparatus, the cell selection feedback signal is calculated by the mobile apparatus according to the pilot signal; and performing hand off and communicating with the mobile apparatus, if the base station is selected.

Further, the present invention includes A mobile system configured to perform handoff between a mobile apparatus and a plurality of base stations, comprising the mobile apparatus, further comprising: a power estimator, configured to receive a plurality of pilot signals that each correspond to one of the plurality of base stations, and estimate a power level for each of said plurality of pilot signals; a cell selector, coupled to said power estimator, configured to select at least one base stations for blanking in response to said power level, the selected base stations are indicated in a plurality of bits; a feedback channel generator, coupled to said cell selector, configured to generate a plurality of cell selection feedback signals indicating said plurality of base stations, wherein the cell selection feedback signal is transmitted to said plurality of base stations, and said cell selection feedback signal directs said one or more base stations to perform said blanking; and the plurality of base stations coupled to the mobile apparatus, configured to generate the plurality of pilot signals corresponding to each of the base station, and receive the plurality of cell selection feed back signal, if the base station is selected, the base stations is configured to perform hand off and communicate with the mobile apparatus.

Regarding industrial applicability, the present invention may be implemented within one or more integrated circuits within a cellular communications device, such as a mobile station (i.e., cell phone) or base station.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
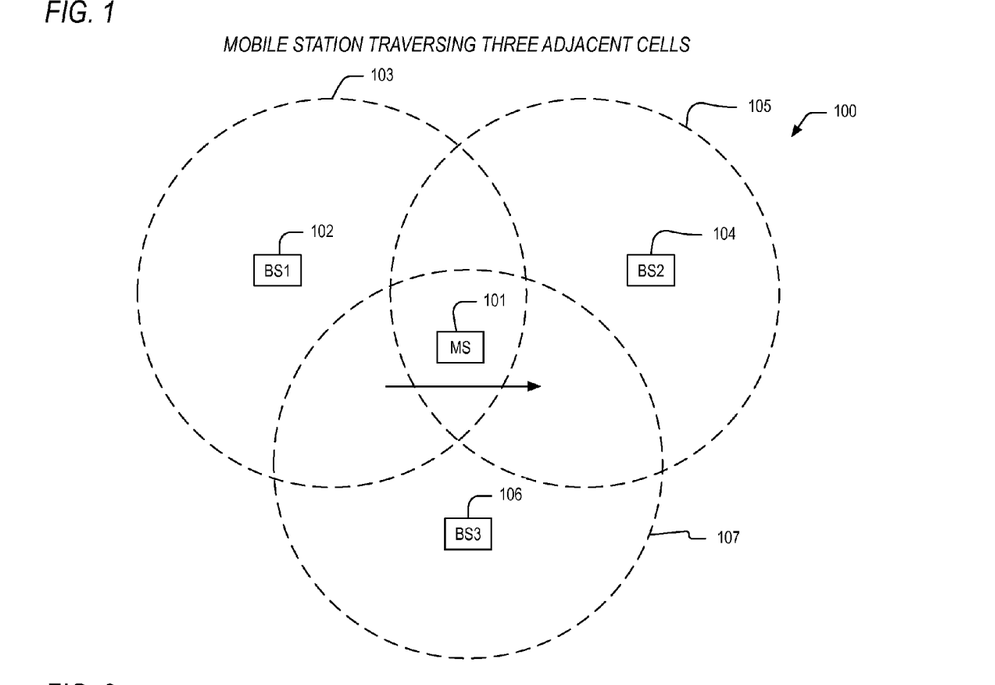
FIG. 1 is a block diagram illustrating a mobile station traversing through three cellular coverage areas.
Figure 2:
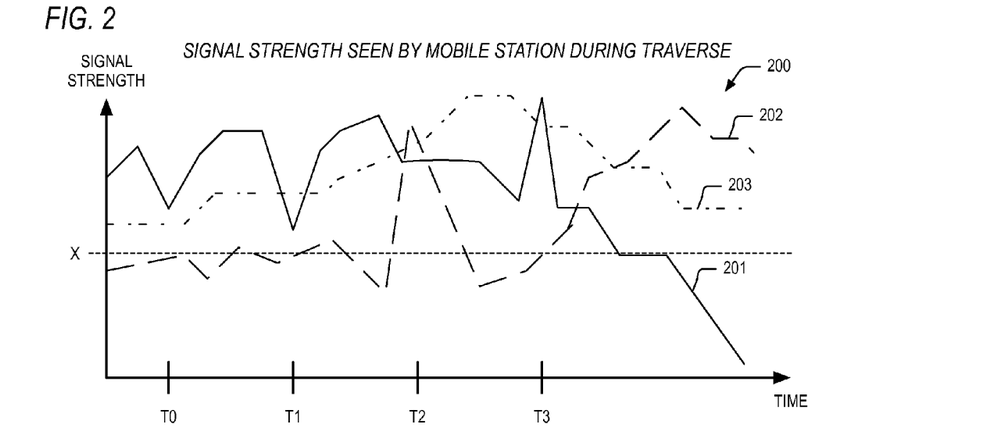
FIG. 2 is a timing diagram depicting the strength of respective signals received by the mobile station of FIG. 1 as it traverses through the cellular coverage areas.

In view of the above background discussion on CDMA-based telecommunications and associated techniques employed within cell phone systems for performing handoff of a mobile station from one cell to the next, a discussion of the problems inherent in the present day approach will now be presented with reference to FIGS. 1-2. Following this discussion, a detailed disclosure of the present invention will be presented with reference to FIGS. 3-8. The present invention overcomes the limitations of existing soft handoff mechanisms by providing a technique that allows for significant improvements in interference reduction, channel resource availability, and voice capacity. The techniques according to the present invention are furthermore fully backward compatible with legacy mobile stations.

Turning to FIG. 1, a block diagram 100 is presented illustrating a mobile station 101 traversing through three cellular coverage areas 103, 105, 107. Cellular signals are received from and transmitted to the mobile station 101 by three base stations 102, 104, 106, where the strength of the respective transmitted and received signals is a function of the location of the mobile station 101 at it traverses through the cellular coverage areas 103, 105, 107. The particular number of base stations 102, 104, 106 and their respective cells 103, 105, 107 is shown for illustrative purposes only. As one skilled in the art will appreciate, the number of cells 103, 105, 107 within which a particular mobile station 101 falls is a function of the mobile station's location and the deployment pattern of the base stations 102, 104, 106.

As is alluded to above, CDMA techniques allow for significant increases in user capacity over formerly employed techniques such as Global System for Mobile Communications (GSM), which utilizes frequency division multiple access (FDMA) as its principal access technology. Although the mobile station 101 is shown in the block diagram 100 at the intersection of the three cells 103, 105, 107, it is noted that the mobile station 101, as a function of its location, may only be serviceable by a single cell 103, 105, 107, or by numerous cells 103, 105, 107 up to the mobile station's capacity to process respective signals.

Under GSM a mobile station cannot simultaneously communicate with more than one base station because individual base stations utilize different frequencies to communicate with mobile stations. Accordingly, when the signal reception at a mobile station drops below an acceptable threshold, the mobile station sends a request through its corresponding base station requesting that it be handed off to another base station having a stronger signal. To accomplish the handoff, the mobile station is directed to change its transmit/receive frequencies to those associated with the new servicing base station and the new base station was instructed to provide for communications continuity.

The above GSM example is known as a hard handoff. This is because there is no overlap of coverage under FDMA. Even though a mobile station 101 may be located as is shown in the block diagram 100 such that it is possible to receive and transmit signals to multiple base stations 102, 104, 106, in practice the mobile station 101 cannot do so under GSM because the mobile station 101 does not possess the capability to simultaneously communicate over multiple frequency channels. It can only transmit and receive on one frequency channel at a time.

Under CDMA, however, all communications between a mobile station 101 and any base station 102, 104, 106 within a cellular network utilize the same frequency channel, and thus the mobile station 101 is capable of decoding and utilizing signals from any base station 102, 104, 106 to which it is assigned by a base station controller (not shown). As one skilled in the art will appreciate, it is present day practice to assign up to approximately six active base stations 102, 104, 106 to simultaneously communicate with any given mobile station 101, depending upon its location relative to the base stations 102, 104, 106. Although as many as six base stations 102, 104, 106 may be assigned to provide signaling in the form of a pilot signal to the mobile station 101, only one of the base stations 102, 104, 106 is designated as the primary, or servicing base station 102, 104, 106. The servicing base station 102, 104, 106 provides the traffic channel to the mobile station 101. These assignments are made by the base station controller and are coordinated via specific protocol with each of the base stations 102, 104, 106 and the mobile station 101. In addition, it is noted that the maximum number of base stations 102, 104, 106 that intercommunicate with the mobile station 101 under CDMA is merely a function of processing capability of the mobile station 101 and capacity of the cellular network. Conventionally, the base stations 102, 104, 106 with which a mobile station 101 is currently communicating are known as the mobile station's active set, and the primary base station within the active set is known as the serving base station. The mobile station 101 receives a traffic channel (i.e., data and voice information) from all the base stations 102, 104, 106 in its active set. Control information is received from and provided to the serving base station only, although the mobile station 101 monitors pilot signals from all base stations 102, 104, 106 in its active set. When the signal quality from a particular base station in the active set becomes stronger than that of the serving base station, then the mobile station 101 requests that the particular base station be designated as its serving base station. And since the mobile station 101 has been and is continuing to receive signals from all the base stations 102, 104, 106 in its active set, the change in designation of the serving base station is somewhat transparent to an ongoing call. This is known as a soft handoff or soft handover. In contrast to a hard handoff where an entire frequency channel is changed, a soft handoff occurs simply by change in designation within the mobile station's active set.

Each of the base stations 102, 104, 106 employs a specific pseudo-random code, or "long code" to modulate traffic, paging, and signaling information to the mobile station 101, however, as one skilled in the art will appreciate, these long codes are simply time shifted versions of a master pseudo-random code, where the time shift is known as an offset.

The mobile station 101 must deal with the effects of multipath, that is, delayed arrival of signals from each of the base stations 102, 104, 106 which have been reflected or refracted as a function of signal path and environment. And a typical CDMA-based mobile station 101 will utilize a rake receiver (not shown) to demodulate the desired channel (e.g., traffic channel) in its receiver input by despreading it with the corresponding codes assigned to the mobile station and base station, typically known as Walsh codes and short PN (i.e., "pseudo-random) codes. Because the mobile station 101 receives the signal transmitted from the base stations 102, 104, 106 through several paths with different propagation delays, the received signal, in addition to being corrupted by noise, is also distorted by the channel fading. The rake receiver is employed within a CDMA-based mobile station 101 to use the direct-sequence spreading of the coded signal to separate the components of the received signal corresponding to different propagation-delay paths. Analogous in result to the use of frequency diversity in FDMA systems, the use of a rake receiver to derive diversity gain from a potentially poor channel in a CDMA communications system is often referred to as macro diversity. After rake receiver despreading, a demodulation routine detects the transmitted data from each delayed-path component and combines the results to preferably yield a received signal having a higher quality that would otherwise be attainable.

Since the signal transmitted by a given base station 102, 104, 106 is merely an offset version of the same signal transmitted by any other base station 102, 104, 106, the technique of macro diversity is extended in a present day mobile station 101 beyond the level of fading to include the combination of signals from multiple base stations 102, 104, 106, which in the optimum result in improved system performance.

It is beyond the scope of the present application to provide an in-depth description of CDMA-based communications and attendant mechanisms that provide for communication over a CDMA-based cellular, or radio, network such as CDMA 2000 or IS-95. However, it is sufficient to note that, regardless of protocol or type of modulation scheme provided for by a particular CDMA-based communications network, macro diversity techniques (e.g., rake receivers) will almost certainly be utilized to enable processing gains.

The present invention is directed towards overcoming limitations in a CDMA-based wireless radio or telecommunications system as will be described in further detail herein below. The well known IS-95 (i.e., CDMA 2000) packetized protocol will be utilized to teach aspects of the present invention because this protocol is widely recognized, however, the present inventors note that the techniques provided for by the present invention extend beyond IS-95 to any other protocol or system of communications where macro diversity principles are employed to combine signals from multiple base stations 102, 104, 106 in order to yield a higher quality received signal within a given mobile station 101.

Reference is now made to FIG. 2, where a timing diagram 200 is presented depicting the strength of respective signals 201-203 received by the mobile station of FIG. 1 as it traverses through the cellular coverage areas. For purposes of this example, consider that signal 201 is the pilot signal 201 corresponding to base station 1 102, signal 202 is the pilot signal 202 corresponding to base station 2 104, and signal 203 corresponds to base station 3 106. Now consider that the mobile station 101 is at the far left edge of the cell 103 corresponding to base station 1 102. Thus, as one skilled in the art will appreciate, the relative signal strengths of each of the three received signals 201-203 would be as is shown at time T0 in the timing diagram 200. That is, because the mobile station 101 is at the far left of the diagram 100, it is closer to base station 1 102, and thus would receive a stronger signal 201 from base station 1 102. Next in order of proximity is base station 3 106, whose signal 203 is shown as being weaker than the signal 201 of base station 1 102, but which is stronger than the signal 202 corresponding to base station 2 104, because base station 2 104 is farthest from the mobile station 101.

It is the general expectation that the relative strengths of each of the signals 201-203 would persist in order at time T1 when the mobile station 101 is, say, closest to base station 1 102. However, because of the constantly changing nature of the transmission environment associated with cellular communications, the relative strengths of the signals 201-203 at time T1 shows signal 203, which corresponds with base station 3 106 as being weaker than signal 201. And at time T2, when the mobile station 101 is closes to base station 3, because of sporadic conditions due to antenna deployment and transmission effects, signal 202, which is associated with base station 2 104, is strongest. Likewise, at time T3, when the mobile station 101 is closest to base station 2 101, because of these same conditions, signal 201 is momentarily strongest.

The timing diagram 200 of FIG. 2 is presented to introduce the problems that have been observed by the present inventors associate with macro diversity combining, and more specifically in the context of performing a soft handoff. And consider that, rather than a single pilot signal 201-203 associated with each base station 102, 104, 106, a present day CDMA-base mobile station 101 is receiving—and processing—numerous delayed copies of each of the signals 201-203 associated with each of the base stations 102, 104, 106 in its active set. These delayed copies of each of the signals 201-203 are due to multipath effects. And while it is theoretically advantageous to argue that more delayed copies of the same signal 201-203 will add to the overall quality of reception for a particular mobile station 101, the present inventors have observed that there are practical considerations associated with the design and production of receivers within a present day mobile station 101. For example, there is a signal strength threshold, X, as is shown in the timing diagram 200, below which a copy of any signal 201-203 merely adds noise to the receiver. That is, when the strength of a received signal 201-203 (or any delayed copies) is below the threshold, X, that signal 201-203 becomes a source of interference rather than a source for macro diversity. In one embodiment, the threshold, X is determined according to the acceptable data error rate, channel capacity, and loss rate of reverse link or forward link.

Consider at times T0, T1, and T3 when the strength of signal 202 is below the threshold, X. Rather than contributing to reception, and thus determination of optimum conditions for soft handoff in the mobile station 101 at these times, the pilot signal 202 from base station 2 104 is actually interfering with the soft handoff process because it's signal-to-noise ratio (SNR) may be excessively low.

In many configurations, macro diversity combining is enabled when the mobile station 101 is in a soft handoff state. Certainly, soft handoff can help improve cell-edge user experience. Soft handoff with macro-diversity can increase the number of available channels in each cell due to interference reduction. Soft handoff can also help reduce interference to adjacent cells. Hence, the present inventors have observed that macro diversity itself is advantageous under soft handoff conditions. However, too many low SNR diversity branches is detrimental under real world conditions because of the extra load on the communications system that is incurred due to the increase in the number of channels occupied and reserved for macro-diversity combining of pilot signals 201-203.

More specifically, the present inventors have found that most mobile stations 101 are typically performing soft handoff under conditions consisting of 2, 3, and 4 base stations in the active set, where the most prevalent case is that of 3 base stations 102, 104, 106, as is depicted in FIG. 1. The present inventors have also noted that too many mobile stations in a soft handoff state may block the admission of new traffic and may decrease the actual user capacity of a given system. And as the number of soft handoff instances increase, both transmission power and interference increases, thus causing more interference to adjacent cells in the network.

According, the present invention is provided to overcome the above-noted disadvantages and limitations. In one aspect, it is a feature of the present invention to limit the number of high-order soft handoffs. It is furthermore a feature of the present invention to preclude or eliminate low SNR diversity branches under soft handoff conditions in order to improve performance of both mobile stations 101 and the overall communications system. These objectives are realized in apparatus and methods corresponding to the present invention where poorly contributing base stations in an active set are identified and their transmissions temporarily paused to a requesting mobile station for a prescribed number of sub-units within a CDMA transmission frame. By temporarily removing interfering signals from a mobile stations reception flow, soft handoff performance increased, and network resources are freed to service other users. The present invention will now be described with reference to FIGS. 3-8.

Figure 3:
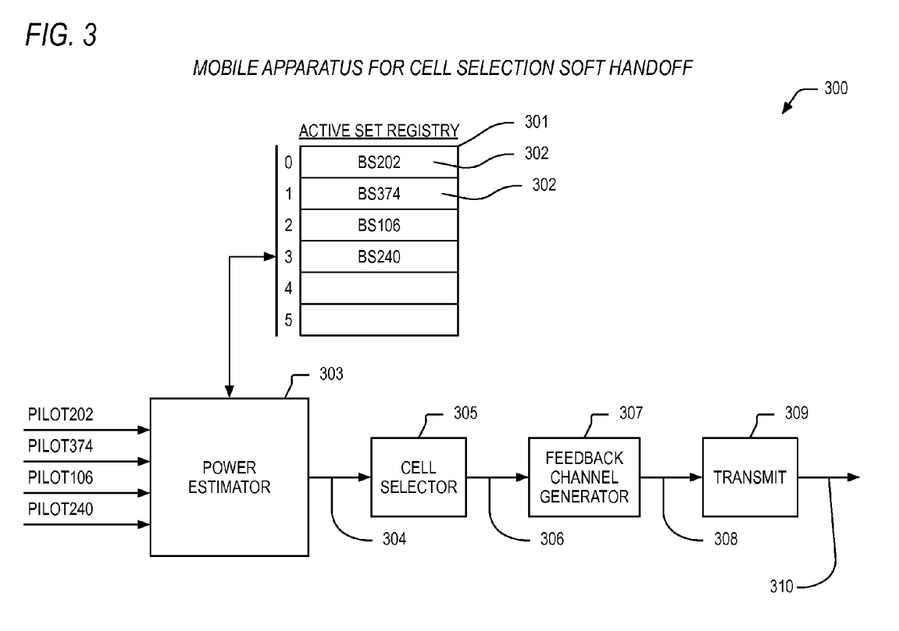
FIG. 3 is a block diagram featuring a mobile apparatus according to the present invention that employs a cell selection soft handoff technique.

Now referring to FIG. 3, a block diagram is presented featuring a mobile apparatus 300 according to the present invention that employs a cell selection soft handoff technique. The concept of cell selection soft handoff according to the present invention, as allude to above, is to temporarily pause, or otherwise disable, unwanted transmission from one or more base stations in a mobile station's active set. By minimizing these transmissions that are viewed at a mobile station's receiver as interference, a simple and effective solution for optimizing receiver and network performance is provided which additionally minimizes adjacent cell interference. For a mobile station according to the present invention, performing cell selection soft handoff maximizes the mobile station's performance. For serving base stations according to the present invention, cell selection soft handoff techniques contribute to reduce service block rate. And for the adjacent cells, cell selection soft handoff contributes to a reduction in interference.

The mobile apparatus 300 according to the present invention includes a power estimator 303 that receives plurality of pilot signals (PILOT202, PILOT374, PILOT106, and PILOT240) which correspond to a plurality of base stations (BS202, BS374, BS106, and BS240) that are stored in an active set registry 301 within the mobile station 300. In one embodiment, the active set registry 301 has up to six entries 302 and is capable of tracking pilot signals associated with up to six base stations. The active set registry is 301 is coupled to the power estimator 303.

The power estimator 303 provides estimated power for each of the plurality of pilot signals via bus 304 to a cell selector 305. The cell selector 305 is coupled via bus 306 to a feedback channel generator 307. The feedback channel generator 307 is coupled via bus 308 to a transmitter 307, which produces a feedback channel signal to the base station via bus 310.

In operation, the power estimator 303 is continuously monitoring the power of the pilot signals in its active set registry 301 and provides these power estimates via bus 304 to the cell selector 305. In one embodiment, the cell selector 305 identifies one or more low SNR, or weak, pilot signals and communicates these weak pilots to the feedback channel generator 307 via bus 306. In one embodiment, the cell selector 305 is configured to identify the weakest pilot signal in the active set registry 301 when there are more than two base stations in the active set registry 301. In another embodiment, the cell selector 305 is configured to identify the two weakest pilot signals in the active set registry 301, when there are more than three base stations in the registry 301. In a further embodiment, the cell selector 305 is configured to identify the weakest pilot signals in the active set registry 301, so as to limit soft handoff macro diversity operations to three base stations. In yet another embodiment, the cell selector 305 is configured to determine and identify the weakest pilot signals in the active set registry 301, so as to limit soft handoff macro diversity operations to two base stations. Other similar embodiments are contemplated as well.

The weak pilot signals are provided to the feedback channel generator 307 via bus 306, which in turn generates a feedback signal for transmission to each identified base station. The feedback signal for an identified base station directs the base station to pause transmission to the mobile station 300 for a prescribed number of sub-units in a CDMA frame. In one embodiment, the identified base station is directed to pause transmission to the mobile station for a following 2 sub-units. In another embodiment, the identified base station is directed to pause transmission to the mobile station for a following 4 sub-units. In a CDMA 2000 embodiment, the identified base station is directed to pause transmission to the mobile station for a following prescribed number of power control groups (PCGs), which is, as one skilled in the art will appreciate, $\frac{1}{16}^{th}$ of a 20-millisecond CDMA frame.

In accordance with the particular protocol employed, the one or more feedback channel signals are provided via bus 308 to the transmit logic 309, which produces the appropriate encoding and modulations to transmit the feedback channel signal to each of the identified base stations.

Figure 4:
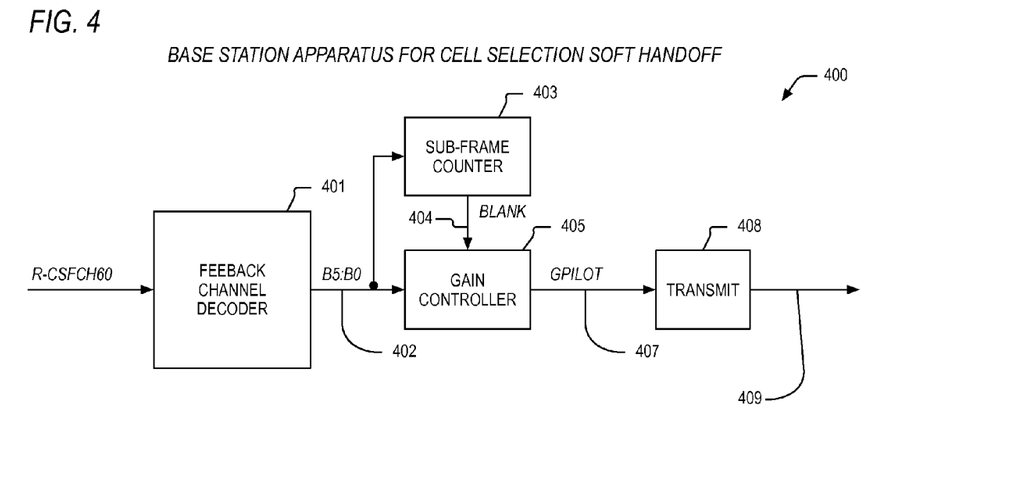
FIG. 4 is a block diagram showing a base station apparatus according to the present invention that employs cell selection soft handoff.

Now turning to FIG. 4, a block diagram is presented showing a base station 400 according to the present invention that employs cell selection soft handoff. The base station 400 includes a feedback channel decoder 401 that receives a plurality of feedback channel signal corresponding to a plurality of mobile stations which have been assigned to the base station 400 by the network controller (not shown). For illustrative purposes, only one feedback channel signal R-CS-FCH60 (i.e., Reverse Link-Cell Selection Feedback Channel 60) is shown, which corresponds to a mobile station according to the present invention, as is described above with reference to FIG. 3.

The feedback channel decoder 401 is coupled via feedback bus 402 to a sub-frame counter 403 and a gain controller 405. The sub-frame counter 403 is coupled to the gain controller via bus 404. The gain controller 405 generates a gain controlled pilot signal GPILOT, and provides that pilot signal GPILOT to a transmitter 408 via bus 407. The transmitter produces a modulated pilot signal suitable for transmission to the mobile station via bus 409, in accordance with the particular CDMA access technology with is employed by the network.

In operation, feedback channel signals R-CSFCH60 are received at the base station 400 and are processed by the feedback channel decoder 401 to yield a plurality of cell selection bits B5:B0 that correspond to a plurality of base stations 400 which are within a given mobile station's active set. These cell selection bits B5:B0 are provided via bus 402 to both the gain controller 405 and the sub-frame counter 403. The sub-frame counter 403 determines if a designated one of the bits B5:B0 is asserted to indicate that cell selection soft handoff is to be employed during a following prescribed number of sub-frames transmitted to the mobile station. The gain controller 405 is configured to dynamically control the transmission gain of the base station's pilot signal, among other signals as well, on a sub-frame by sub-frame basis.

If the sub-frame counter 403 determines that the mobile station is requesting cell selection during a soft handoff, signal BLANK is asserted over bus 404 during the following prescribed number of sub-frames, where the prescribed number of sub-frames (or "sub-units") comports with that number described above with reference to the mobile station 300 according to FIG. 3, that is, a following two sub-frames or a following four sub-frames. In a CDMA 2000 embodiment, signal BLANK is asserted for the following two PCGs. In another CDMA 2000 embodiment, signal BLANK is asserted for the following four PCGs.

The gain controller 405 controls the gain of the pilot signal for the base station 400 responsive to the state of signal BLANK. If BLANK is not asserted, then the gain controller 405 generates a gain controlled pilot signal GPILOT in accordance with other power control mechanisms provided according to the specific protocol which is employed by the network. However, if BLANK is asserted, then the gain controller 405 generates a gain controlled pilot signal GPILOT which exhibits a gain factor of 0. Thus, when BLANK is asserted, the transmitter 408 temporarily ceases transmission of the base station's pilot signal. When BLANK is not asserted, the transmitter 408 generates the pilot signal in accordance with other power control features provided for by the specific network protocol.

This 2-way handshake for "blanking" a pilot signal enables a particular mobile station according to the present invention to actively and dynamically eliminate base station pilots which are interfering with the soft handoff process because their SNR is so low. By enabling a mobile station to request cell selection during the soft handoff process, network performance is improved.

Figure 5:
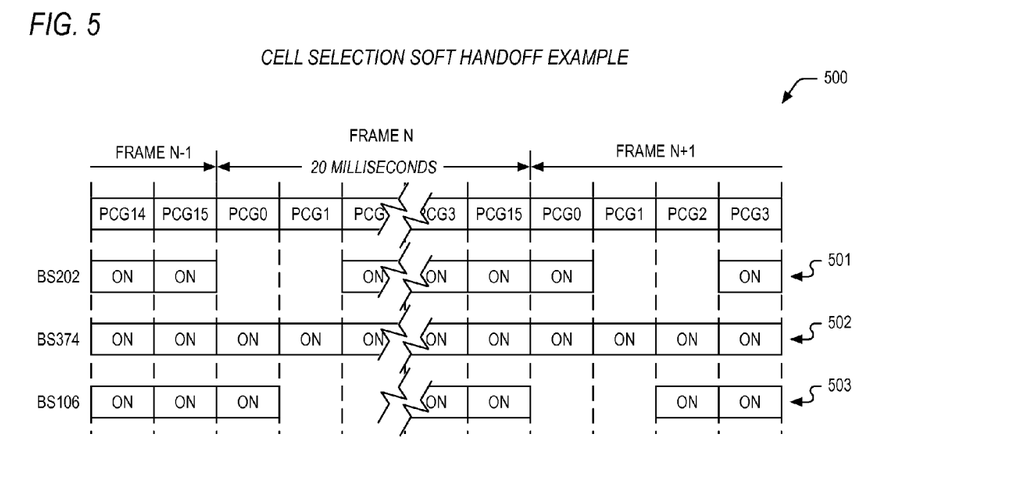
FIG. 5 is a timing diagram depicting an exemplary cell selection soft handoff.

FIG. 5 is a timing diagram 500 that illustrates an exemplary cell selection soft handoff according to the present invention. The timing diagram 500 shows three pilot signals 501-503 that each correspond to a particular base station BS202, BS374, BS106 which are within a mobile station's active set. For clarity purposes, CDMA 2000 frames are employed in the diagram 500, which each comprise 16 PCGs (PCG0-PCG15). Thus each sub-frame is $\frac{1}{16}^{th}$ of a 20-millisecond CDMA 2000 transmission frame.

The diagram 500 only depicts the forward pilot channel signals 501-503 for the base stations BS202, BS374, BS106. As is described below, a mobile station according to the present invention communicates with each of these base stations in its active set registry via the reverse link feedback channel described above.

Consider that the mobile station is in a soft handoff state and that cell selection soft handoff is being employed to eliminate undesirable interference in the mobile station's receive path to allow the mobile station to determine the strongest pilot signal that is being received so as to provide for a soft handoff request. During PCG14 of FRAME N−1, the mobile station is receiving pilot signals (indicated by "ON") from all three base stations BS202, BS374, BS106. During FRAME N−1, PCG15, all three base stations BS202, BS374, BS106 are transmitting pilots as well, however, during this PCG, the mobile station sends cell selection feedback to BS202 requesting that its pilot signal be blanked, or temporarily paused, for the next two PCGs. In response, BS202 transmits a zero-gain pilot signal to the mobile station during PCG0 and PCG1 of FRAME N, thus eliminating this source of interference so that the mobile station can more effectively process the incoming pilot signals to make a soft handoff determination.

Likewise, during PCG15, the pilot from BS106 has dropped below a practical threshold such that it is interfering with reception of the pilot signals 501-503. Consequently, during PCG0 of FRAME N, the mobile station sends cell selection feedback to BS106 requesting that its pilot signal be blanked, or temporarily paused, for the next two PCGs. In response, BS106 transmits a zero-gain pilot signal to the mobile station during PCG1 and PCG1 of FRAME N.

As the diagram 500 illustrates, the mobile station is only tracking the pilot signal from BS374 during PCG1 of FRAME N, thus enabling the mobile to more effectively determine optimum conditions for the soft handoff. And as can furthermore be inferred from the diagram 500, the pilot signal 502 from BS374 appears to be stronger than the other two pilot signals 501, 503 because a request for pilot blanking is never issued over the reverse link feedback channel to BS374.

In similar fashion, during PCG15 of FRAME N, the mobile station requests cell selection blanking for pilot 503, and BS106 responds by providing zero gain to this signal 503 during PCG0 and PCG1 of FRAME N+1. Likewise, during PCG0 of FRAME N+1, the mobile station requests cell selection blanking for pilot 501, and BS202 responds by providing zero gain to this signal 501 during PCG1 and PGG2 of FRAME N+1.

Figure 6:
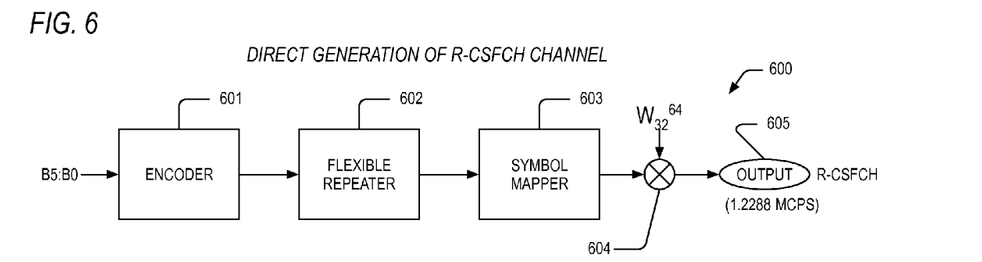
FIG. 6 is a block diagram detailing a direct generation embodiment of the feedback channel generator of FIG. 3.

Turning now to FIG. 6, a block diagram is presented detailing a direct generation embodiment 600 of the feedback channel generator 307 of FIG. 3. The direct feedback generator 600 receives channel selection bits B5:B0 from a power estimator according to the present invention, which has determined that the strength of the pilot signals corresponding to one or more of the base stations in its active set have dropped below an acceptable threshold with respect to using macro diversity for the accomplishment of a soft handoff. The state of the bits B5:B0 are set to indicate whether or not the corresponding pilot signals are to be blanked or not in subsequent transmission sub-frames.

The direct feedback channel generator 600 includes a convolutional encoder 601 that is coupled to a flexible repeater 602. The flexible repeater 602 is coupled to a symbol mapper 603. The symbol mapper 603 is coupled to a modulator 604, which also receives a 64-bit Walsh code for coding of an output component 605, of CDMA channel that carries the pilot signal for the corresponding base station. The specific forms of the encoder 601, repeater 602, and symbol mapper 603 are chosen to maximize reliable transmission of information according to the CDMA protocol that is employed. The modulator 604 accomplishes spreading of the feedback channel symbols generated by the symbol mapper 603. Hence, according to the embodiment 600 of FIG. 6, a single reverse feedback channel signal R-CSFCH is employed to carry cell selection information for each of the base stations within the mobile station's active set.

Figure 7:
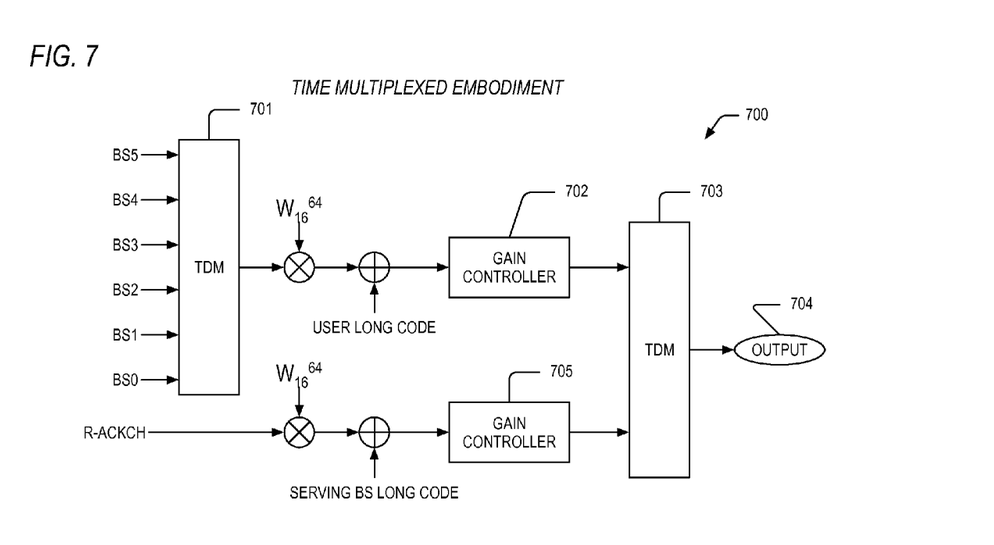
FIG. 7 is a block diagram highlighting a time multiplexed embodiment of the feedback channel generator of FIG. 3.

In FIG. 7, a block diagram is presented highlighting a time multiplexed embodiment 700 of the feedback channel generator 307 of FIG. 3. In the time multiplexed feedback channel generator 700, encoded and mapped cell selection feedback channels R-CSFCH[5:0] are passed through a time division multiplexor (TDM) 701, whose output is modulated with a single Walsh code. In parallel, a reverse link acknowledge channel R-ACKCH is also modulated with the same Walsh code. The Walsh modulated feedback channels are added to the particular mobile station's long code, which is provided to a gain controller 702, and whose output is provided to a second TDM 703. The Walsh modulated acknowledge channel is added to the serving base station's long code, which is provided to a second gain controller 705, whose output is provided to the second TDM 703. An output 704 of the second TDM 703 is the multiplexed cell selection and reverse link acknowledge information to the base stations. In this embodiment 700, each of the cell selection feedback channels R-CSFCH[5:0] are covered by an single Walsh Code and are multiplexed in time with the acknowledge channel. The gain controllers 702, 705 are provided in the channel paths to introduce a power boost when required do to the weak nature of the transmission path back to some of the base stations.

Figure 8:
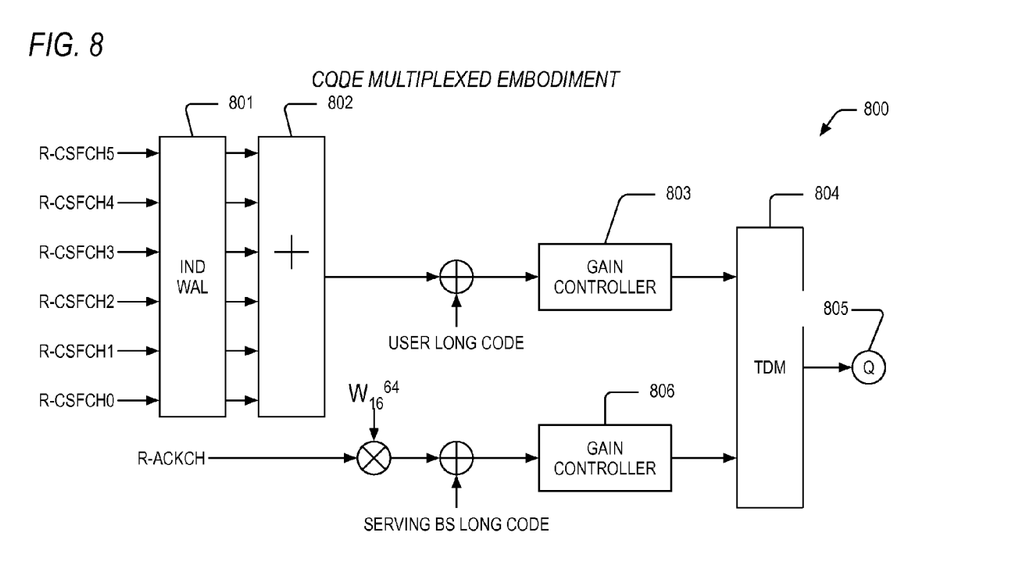
FIG. 8 is a block diagram featuring a code multiplexed embodiment of the feedback channel generator of FIG. 3.

FIG. 8 is a block diagram featuring a code multiplexed embodiment 800 of the feedback channel generator 307 of FIG. 3. In the code multiplexed feedback channel generator 800, encoded and mapped cell selection feedback channels R-CSFCH[5:0] are passed through Individual Modulation Logic 801 that comprises a plurality of modulators, each providing an individual Walsh cover for each of the input channels R-CSFCH[5:0]. The modulated signals are chip-by-chip added together by a chip adder 802, whose output is summed with the mobile station's long code, and passed through a gain controller 803. This composite feedback channel is provided to a TDM 804 whose other input is a Walsh modulated reverse acknowledge channel generated as described above with reference to FIG. 7. The output of the TDM 804 is the multiplexed cell selection and reverse link acknowledge information to the base stations. In this embodiment 800, each of the cell selection feedback channels R-CSFCH[5:0] are covered by individual Walsh Codes and are multiplexed in time with the acknowledge channel. The gain controllers 803, 806 are provided in the channel paths to introduce a power boost when required do to the weak nature of the transmission path back to some of the base stations.

Advantageously the employment of cell selection soft handoff techniques according to the present invention, as disclosed herein, provide for improved macro diversity gain, interference reduction caused by adjacent cells because a mobile station according to the present invention is enabled to select the adjacent base stations for transmission when the mobile station is in the soft handoff mode. By selecting to eliminate some weakly performing base stations, macro diversity channel resources within the mobile station can be optimally employed.

Thus, the apparatus and method for cell selection soft handoff, by allowing a mobile station to request temporary disablement of unwanted or undesirable transmissions from one or more cells in its active set provide for a effective solution for optimizing the receiver and network performance and managing adjacent cell interference over that which has heretofore been provided.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A mobile apparatus wirelessly coupled to a plurality of base stations, comprising:
   a power estimator, configured to estimate power levels for a plurality of pilot signals that correspond to the plurality of base stations in the mobile apparatus's active set;
   a cell selector, coupled to said power estimator, configured to select at least one of the plurality of base stations in the mobile apparatus's active set for blanking, in response to said power levels that were estimated, wherein said at least one of the plurality of base stations in the mobile apparatus's active set are indicated in a plurality of bits; and
   a feedback channel generator, coupled to said cell selector, configured to generate a plurality of cell selection feedback signals indicating the plurality of base stations in the mobile apparatus's active set, wherein each of said plurality of cell selection feedback signals is transmitted to the plurality of base stations in the mobile apparatus's active set, and wherein at least one of said plurality of cell selection feedback signals directs said at least one of the plurality of base stations in the mobile apparatus's active set to perform said blanking in transmission, and wherein said blanking is a temporary pause in transmission for a following prescribed number of power control groups from the at least one of the plurality of base stations that remain in the mobile apparatus's active set, and wherein the at least one of said plurality of cell selection feedback signals prescribes the following prescribed number of power control groups.

2. The mobile apparatus as recited in claim 1, wherein if a power level for one of said plurality of pilot signals is less than a threshold, said cell selector selects a corresponding base station in the mobile apparatus's active set for said blanking, and wherein if said power level for said one of said plurality of pilot signals is not less than said threshold, said cell selector doses not select said corresponding base station in the mobile apparatus's active set for said blanking.

3. The mobile apparatus as recited in claim 2, wherein said threshold is determined according to any combination of features selected from a group, comprising:
   acceptable data error rate;
   channel capacity; and
   loss rate of radio link.

4. The mobile apparatus as recited in claim 1, wherein when one of the plurality of base stations in the mobile apparatus's active set is not selected for said blanking, the mobile apparatus performs soft handoff with said one of the plurality of base stations in the mobile apparatus's active set.

5. The mobile apparatus as recited in claim 1, wherein said feedback channel generator comprises:
   a convolutional encoder, configured to receive said plurality of bits indicating the plurality of base stations in the mobile apparatus's active set, and configured to encode said plurality of bits directly into a plurality of data signals; and
   a modulator, operatively coupled to said convolutional encoder, configured to modulate said plurality of data signals with a single Walsh code to generate said plurality of cell selection feedback signals.

6. The mobile apparatus as recited in claim 1, wherein said feedback channel generator comprises:
   a first time division multiplexer, configured to receive said plurality of bits, and configured to multiplex said plurality of bits in timely fashion, thereby generating a multiplexed plurality of bits;
   a first modulator, configured to modulate said multiplexed plurality of bits with a single Walsh code, and to add a user long code to yield a first signal;
   a second modulator, configured to modulate a reverse link acknowledge signal received with the single Walsh code, and to add a serving base station long code to yield a second signal; and
   a second time division multiplexer, configured to receive and multiplex said first and second signal in timely fashion to generate said plurality of cell selection feedback signals.

7. The mobile apparatus as recited in claim 1, wherein said feedback channel generator comprises:
   an individual Walsh logic, configured to receive and cover said plurality of bits with a corresponding plurality of Walsh Codes, thereby generating a plurality of Walsh modulated signals;
   a chip adder, coupled to said individual Walsh logic, configured to receive said plurality of Walsh modulated signals, wherein said chip adder is configured to add said plurality of Walsh modulated signals together and sum with the mobile apparatus's long code to yield a first signal;
   a modulator, configured to modulate a reverse link acknowledge signal received with a single Walsh code, and to add a serving base station long code to yield a second signal; and
   a time division multiplexer, configured to receive and multiplex said first and second signals in timely fashion to generate said plurality of cell selection feedback signals.

8. A method for a mobile apparatus which is wirelessly coupled to a plurality of base stations, comprising:
   estimating power levels for a plurality of pilot signals that correspond to the plurality of base stations in the mobile apparatus's active set;
   selecting at least one of the plurality of base stations in the mobile apparatus's active set for blanking in response to said power levels that were provided by said estimating, wherein the at least one of the plurality of base stations in the mobile apparatus's active set are indicated in a plurality of bits; and
   generating a plurality of cell selection feedback signals indicating the plurality of base stations in the mobile apparatus's active set, wherein each of the cell selection feedback signals is transmitted to the plurality of base stations in the mobile apparatus's active set, and wherein at least one of the cell selection feedback signal directs the at least one of the plurality of base stations in the mobile apparatus's active set to perform the blanking, and wherein the blanking is a temporary pause in transmission for a following prescribed number of power control groups from the at least one of the plurality of base stations that remain in the mobile apparayus's active set, and wherein the at least one of the cell selection feedback signals prescribes the following prescribed number of power control groups.

9. The method apparatus as recited in claim 8, wherein if a power level for one of the plurality of pilot signals is less than a threshold, selecting a corresponding base station in the mobile apparatus's active set for the blanking, and wherein if the power level the one of the plurality of pilot signals is not less than the threshold, not selecting the corresponding base station in the mobile apparatus's active set for the blanking.

10. The method as recited in claim 9, wherein the threshold is determined according to any combination of features selected from a group comprising:
    acceptable data error rate;
    channel capacity; and
    loss rate of radio link.

11. The method as recited in claim 8, wherein when one of the plurality of base stations in the mobile apparatus's active set is not selected for the blanking, performing soft handoff with the one of the plurality of base stations in the mobile apparatus's active set.

12. The method as recited in claim 8, wherein said generating further comprises:
    receiving the plurality of bits indicating the plurality of base stations in the mobile apparatus's active set, and encoding the plurality of bits directly into a plurality of data signals corresponding to the plurality of cell selection feedback signals; and
    modulating and transmitting the plurality of data signals with a single Walsh code to generate the plurality of cell selection feedback signals.

13. The method as recited in claim 8, wherein said generating further comprises:
    receiving the plurality of bits, and multiplexing the plurality of bits in timely fashion, thereby generating a multiplexed plurality of bits;
    modulating the multiplexed plurality of bits with a single Walsh code, and adding a user long code to yield a first signal;
    modulating a reverse link acknowledge signal received with the single Walsh code;
    adding the modulated reverse link acknowledge signal to a serving base station long code to yield a second signal; and
    multiplexing the first and second signals in timely fashion to generate the plurality of cell selection feedback signals.

14. The method as recited in claim 8, wherein said generating further comprises:
    receiving and covering the plurality of bits with a corresponding plurality of Walsh Codes, thereby generating a plurality of Walsh modulated signals;
    adding the plurality of Walsh modulated signals together and summing with the mobile station's long code to yield a first signal;
    modulating a reverse link acknowledge signal received with the single Walsh code, and adding a serving base station long code to yield a second signal;
    multiplexing the first and second signals in timely fashion to generate the plurality of cell selection feedback signals.

15. A base station wirelessly coupled to a mobile apparatus, comprising:
    a pilot signal generator, configured to generate a pilot signal corresponding to the base station, wherein the base station is in the mobile apparatus's active set, and wherein the pilot signal comprises a plurality of sub-frame units;
    a receiver, configured to receive a cell selection feedback signal which indicates whether the base station is selected by the mobile apparatus for a blanking, wherein said cell selection feedback signal is calculated by the mobile apparatus according to the pilot signal; and
    a processor, coupled to said pilot signal generator and said receiver, wherein if the base station is selected, said processor is configured to perform said blanking;
    wherein said blanking is a temporary pause in transmission for a following prescribed number of power control groups from one or more base stations that remain in the mobile apparatus's active set, and wherein the cell selection feedback signal prescribes the following prescribed number of power control groups.

16. The base station as recited in claim 15, wherein said prescribed number is based on a request from the mobile apparatus to the base station.

17. The base station as recited in claim 15, wherein said plurality of sub-frame units comprises power control information with the mobile apparatus.

18. A method for a base station coupled to a mobile apparatus, comprising:
    generating a pilot signal corresponding to the base station, wherein the base station is in the mobile apparatus's active set, and wherein the pilot signal comprises a plurality of sub-frame units;
    receiving a cell selection feedback signal which indicates whether the base station is selected by the mobile apparatus for a blanking, wherein the cell selection feedback signal is calculated by the mobile apparatus according to the pilot signal; and
    blanking the base station for the prescribed number of the plurality of sub-frame units,
    wherein said blanking is a temporary pause in transmission for a following prescribed number of power control groups from one or more base stations that remain in the mobile apparatus's active set, and wherein the cell selection feedback signal prescribes the following prescribed number of power control groups.

19. The method as recited in claim 18, wherein the prescribed number is based on a request from the mobile apparatus to the base station.

20. The method as recited in claim 18, wherein the plurality of sub-frame units comprises power control information with the mobile apparatus.

21. A mobile system configured to perform handoff between a mobile apparatus and a plurality of base stations, comprising:
    the mobile apparatus, further comprising:
        a power estimator, configured to receive a plurality of pilot signals corresponding to the plurality of base stations within the mobile apparatus's active set, and to estimate power levels for said plurality of pilot signals;
        a cell selector, coupled to said power estimator, configured to select at least one of the plurality of base stations in the mobile apparatus's active set for blanking in response to said power levels that were estimated, wherein said at least one of the plurality of base stations in the mobile apparatus's active set are indicated in a plurality of bits; and a feedback channel generator, coupled to said cell selector, configured to generate a plurality of cell selection feedback signals indicating the plurality of base stations in the mobile apparatus's active set, wherein each of said plurality of cell selection feedback signals is transmitted to the plurality of base stations in the mobile apparatus's active set, and wherein at least one of said plurality of cell selection feedback signals directs said at least one of the plurality of base stations in the mobile apparatus's active set to perform said blanking; and the plurality of base stations in the mobile apparatus's active set, coupled to the mobile apparatus, configured to generate said plurality of pilot signals, and configured to receive said plurality of cell selection feed back signals, wherein, if said at least one of the plurality of base stations in the mobile apparatus's active set is selected, said at lease one of the plurality of base stations in the mobile apparatus's active set is configured to perform said blanking;

wherein said blanking is a temporary pause in transmission for a following prescribed number of power control groups from one or more of the plurality of base stations that remain in the mobile apparatus's active set, and wherein the at least one of the cell selection feedback signals prescribes the following prescribed number of power control groups.

22. A mobile apparatus wirelessly coupled to a plurality of base stations, comprising:

a power estimator, configured to estimate power levels for a plurality of pilot signals that correspond to the plurality of base stations, wherein the plurality of base stations is in the mobile apparatus's active set;

a cell selector, coupled to said power estimator, configured to select at least one of the plurality of base stations in the mobile apparatus's active set for blanking, in response to said power levels that were estimated, wherein said at least one of the plurality of base stations in the mobile apparatus's active set are indicated in a plurality of bits; and a feedback channel generator, coupled to said cell selector, configured to generate a plurality of cell selection feedback signals indicating the plurality of base stations in the mobile apparatus's active set, wherein each of said plurality of cell selection feedback signals is transmitted to the plurality of base stations in the mobile apparatus's active set, and wherein at least one of said plurality of cell selection feedback signals directs said at least one of the plurality of base stations in the mobile apparatus's active set to perform said blanking, wherein said blanking is a temporary pause in transmission for a following prescribed number of power control groups from one or more of the plurality of base stations that remain in the mobile apparatus's active set, and wherein the at least one of the cell selection feedback signals prescribes the following prescribed number of power control groups.

* * * * *